United States Patent
Iwamura et al.

(10) Patent No.: US 12,015,789 B2
(45) Date of Patent: Jun. 18, 2024

(54) ENCODING DEVICE, DECODING DEVICE AND PROGRAM FOR TRIANGLE MERGE PROTECTION ON BOUNDARY BETWEEN TWO BLOCKS

(71) Applicant: NIPPON HOSO KYOKAI, Tokyo (JP)

(72) Inventors: Shunsuke Iwamura, Tokyo (JP); Atsuro Ichigaya, Tokyo (JP); Shimpei Nemoto, Tokyo (JP)

(73) Assignee: NIPPON HOSO KYOKAI, Tokyo (JP)

(*) Notice: Subject to any disclaimer, the term of this patent is extended or adjusted under 35 U.S.C. 154(b) by 210 days.

(21) Appl. No.: 17/681,296

(22) Filed: Feb. 25, 2022

(65) Prior Publication Data

US 2022/0182646 A1 Jun. 9, 2022

Related U.S. Application Data

(63) Continuation of application No. PCT/JP2020/032783, filed on Aug. 28, 2020.

(30) Foreign Application Priority Data

Aug. 29, 2019 (JP) ................................ 2019-157493

(51) Int. Cl.
*H04N 19/176* (2014.01)
*H04N 19/117* (2014.01)
(Continued)

(52) U.S. Cl.
CPC ......... *H04N 19/176* (2014.11); *H04N 19/117* (2014.11); *H04N 19/119* (2014.11);
(Continued)

(58) Field of Classification Search
CPC .. H04N 19/176; H04N 19/117; H04N 19/119; H04N 19/124; H04N 19/513;
(Continued)

(56) References Cited

U.S. PATENT DOCUMENTS

2019/0313095 A1 10/2019 Ikeda
2020/0014950 A1 1/2020 Abe et al.
(Continued)

FOREIGN PATENT DOCUMENTS

WO 2018/123444 A1 7/2018
WO 2019/039322 A1 2/2019

OTHER PUBLICATIONS

International Search Report issued in PCT/JP2020/032783; mailed Oct. 13, 2020.
(Continued)

*Primary Examiner* — Susan E. Torgerson
(74) *Attorney, Agent, or Firm* — Studebaker & Brackett PC

(57) ABSTRACT

An encoding device 1 includes: a merge predictor 181a configured to generate area prediction images using motion vectors of a plurality of divided areas obtained by dividing an encoding-target block and merge areas at boundaries of a plurality of the generated area prediction images through weighted averaging to generate a prediction block of the encoding-target block: and a filter controller 161 configured to control the deblocking filter based on a position of a merged area merged by the merge predictor 181a through the weighted averaging.

6 Claims, 10 Drawing Sheets

(51) Int. Cl.
  *H04N 19/119* (2014.01)
  *H04N 19/124* (2014.01)
  *H04N 19/50* (2014.01)
  *H04N 19/513* (2014.01)
  *H04N 19/61* (2014.01)
  *H04N 19/86* (2014.01)
  *H04N 19/91* (2014.01)

(52) U.S. Cl.
  CPC ......... *H04N 19/124* (2014.11); *H04N 19/513* (2014.11); *H04N 19/61* (2014.11); *H04N 19/86* (2014.11); *H04N 19/91* (2014.11)

(58) Field of Classification Search
  CPC ........ H04N 19/61; H04N 19/86; H04N 19/91; H04N 19/167; H04N 19/577; H04N 19/136
  USPC .......................................................... 375/240
  See application file for complete search history.

(56) References Cited

U.S. PATENT DOCUMENTS

| 2021/0006803 | A1* | 1/2021 | Zhang | H04N 19/109 |
| 2021/0227212 | A1* | 7/2021 | Lee | H04N 19/119 |
| 2021/0360282 | A1* | 11/2021 | Toma | H04N 19/139 |
| 2022/0060701 | A1* | 2/2022 | Bordes | H04N 19/132 |

OTHER PUBLICATIONS

Recommendation ITU-T H.265, High efficiency video coding, International Telecommunication Union, Dec. 2016, pp. 1-664.

Iwamura, Shunsuke, et al., Non-CE5: Boundary strength derivation of deblocking filter for transform-skipped block, Joint Video Experts Team (JVET) of ITU-T SG 16 WP 3 and ISO/IEC JTC 1/SC 29/WG 11, JVET-O0656, 15th Meeting: Gothenburg, SE, Jul. 3-12, 2019, pp. 1-7.

Meng, Xuewei et al., AHG18/Non-CE5: Deblocking for TPM and BCW, Joint Video Experts Team (JVET) of ITU-T SG 16 WP 3 and ISO/IEC JTC 1/SC 29/WG 11, JVET-P0269-v2, 16th Meeting: Geneva, CH, Oct. 1-11, 2019, pp. 1-8.

Iwamura, Shunsuke, et al., [AHG18] [non-CE5] Boundary strength derivation for CUs with TPM, Joint Video Experts Team (JVET) of ITU-T SG 16 WP 3 and ISO/IEC JTC 1/SC 29/WG 11, JVET-P0602rl, 16th Meeting: Geneva, CH, Oct. 1-11, 2019, pp. 1-5.

* cited by examiner

FIG. 2A
ENCODING-TARGET BLOCK
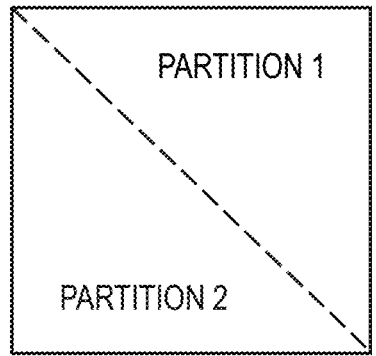
FIG. 2B
ENCODING-TARGET BLOCK
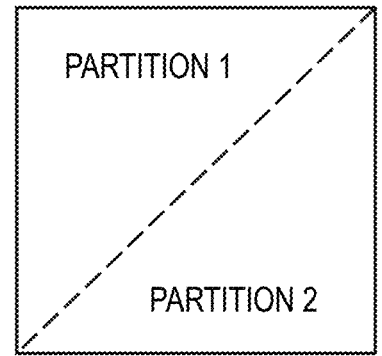

A: $\frac{3}{8} \times P_1 + \frac{5}{8} \times P_2$

B: $\frac{4}{8} \times P_1 + \frac{4}{8} \times P_2$

C: $\frac{7}{8} \times P_1 + \frac{1}{8} \times P_2$

ENCODING DEVICE, DECODING DEVICE AND PROGRAM FOR TRIANGLE MERGE PROTECTION ON BOUNDARY BETWEEN TWO BLOCKS

RELATED APPLICATIONS

The present application is a continuation based on PCT Application No. PCT/JP2020/032783, filed on Aug. 28, 2020, which claims the benefit of Japanese Patent Application No. 2019-157493 filed on Aug. 29, 2019. The content of which is incorporated by reference herein in their entirety.

TECHNICAL FIELD

The present invention relates to an encoding device, a decoding device, and a program.

BACKGROUND ART

In HEVC (High Efficiency Video Coding), and VVC (Versatile Video Coding), which is a next-generation encoding scheme, a deblocking filter is adopted as an encoding in-loop filter (for example, see Non Patent Literature 1). The deblocking filter is an in-loop filter to restrain distortion at a block boundary portion when an encoding process is performed on a block basis.

When intra prediction is applied to at least one of two adjacent blocks, a filter controller, which controls the deblocking filter, applies the deblocking filter to a block boundary between the two blocks.

Meanwhile, when inter prediction is applied to each of two adjacent blocks, the filter controller determines continuity between the two blocks according to a degree of match, or the like, of a value of a motion vector and a reference (reference image) between the two blocks and determines whether or not to apply the deblocking filter to a block boundary between the two blocks.

Meanwhile, in VVC, triangle merge prediction (triangle merge mode) is to be adopted as one type of inter prediction. In the triangle merge prediction, an encoding device divides an encoding-target block into two triangular areas and predicts the two triangular areas using two motion vectors to generate two triangular prediction areas. Then, the encoding device generates a prediction block of the encoding-target block by merging areas of boundaries among the generated plurality of triangular prediction areas through weighted averaging.

There is a case where motion vectors used in the encoding-target block are reutilized upon encoding of an adjacent block, and thus, the encoding device stores information regarding the motion vectors used in triangle merge prediction, that is, information indicating a reference direction, information indicating a reference frame, the number of motion vectors (indicating either uni-prediction or bi-prediction), and values of the motion vectors in a motion vector storage.

More specifically, the encoding device divides the encoding-target block into areas of 4×4 pixels (hereinafter, referred to as "4×4 units"), determines that bi-prediction is applied for a 4×4 unit belonging to a merged area merged through weighted averaging when reference directions of two motion vectors are different and stores information regarding the two motion vectors in the motion vector storage. Meanwhile, the encoding device determines that uni-prediction is applied when the reference directions of the two motion vectors are the same, and stores information regarding one motion vector defined in advance between the two motion vectors in the motion vector storage. Meanwhile, the encoding device determines that uni-prediction is applied for 4×4 unit belonging to an area other than the merged area and stores information regarding one motion vector used to generate a prediction image of the area in the motion vector storage.

CITATION LIST

Non Patent Literature

Non Patent Literature 1: Recommendation ITU-T H.265, (December 2016), "High efficiency video coding", International Telecommunication Union

DISCLOSURE OF INVENTION

In determination of continuity in deblocking filter control in related art, when inter prediction is applied to each of two adjacent blocks, continuity between the blocks is determined based on information regarding motion vectors of the two blocks.

However, when triangle merge prediction is applied to at least one of the two blocks, weighted averaging is applied to the merged area by the triangle merge prediction. In determination of continuity in related art, such weighted averaging is not taken into account, and thus, even when discontinuity occurs at a block boundary between the two blocks, the deblocking filter is not applied, which leads to a problem of causing deterioration in visual terms.

The present invention therefore provides an encoding device, a decoding device and a program that improve image quality and encoding efficiency by appropriately controlling a deblocking filter.

An encoding device according to a first feature performs encoding on each of blocks obtained by dividing an image. The encoding device includes: a merge predictor configured to generate area prediction images using motion vectors for a plurality of divided areas obtained by dividing an encoding-target block and merge areas at boundaries of a plurality of the generated area prediction images through weighted averaging to generate a prediction block of the encoding-target block; a transformer/quantizer configured to perform a transform process and a quantization process on a prediction residual that represents a difference between the encoding-target block and the prediction block; an inverse quantizer/inverse transformer configured to restore the prediction residual by performing an inverse quantization process and an inverse transform process on transform coefficients obtained by the transformer/quantizer; a combiner configured to combine the restored prediction residual and the prediction block to reconstruct the encoding-target block; a deblocking filter configured to perform a filter process on a block boundary between two blocks including the reconstructed encoding-target block and an adjacent block; and a filter controller configured to control the deblocking filter based on a position of a merged area merged by the merge predictor through the weighted averaging.

A decoding device according to a second feature performs decoding on each of blocks obtained by dividing an image. The decoding device includes: an entropy decoder configured to output transform coefficients corresponding to a decoding-target block by decoding an encoded stream; an inverse quantizer/inverse transformer configured to restore a prediction residual by performing an inverse quantization process and an inverse transform process on the transform coefficients outputted by the entropy decoder; a merge predictor configured to generate area prediction images using motion vectors for a plurality of divided areas obtained by dividing the decoding-target block and merge areas at boundaries of a plurality of the generated area prediction images through weighted averaging to generate a prediction block of the decoding-target block; a combiner configured to combine the restored prediction residual and the prediction block to reconstruct the decoding-target block; a deblocking filter configured to perform a filter process on a block boundary between two blocks including the reconstructed decoding-target block and an adjacent block; and a filter controller configured to control the deblocking filter based on a position of a merged area merged by the merge predictor through the weighted averaging.

A program according to a third feature causes a computer to function as the encoding device according to the first feature.

A program according to a fourth feature causes a computer to function as the decoding device according to the second feature.

According to the present invention, an encoding device, a decoding device and a program that improve image quality and encoding efficiency by appropriately controlling a deblocking filter, can be provided.

BRIEF DESCRIPTION OF DRAWINGS

FIG. 2A is a diagram illustrating operation of a merge predictor according to the embodiment.

FIG. 2B is a diagram illustrating operation of a merge predictor according to the embodiment.

DESCRIPTION OF EMBODIMENTS

An encoding device and a decoding device according to an embodiment are described with reference to the accompanying drawings. The encoding device and the decoding device according to the embodiment encode and decode videos such as MPEG videos. In the description of the drawings below, the same or similar reference signs are used for the same or similar parts.

<Encoding Device>

Figure 1:
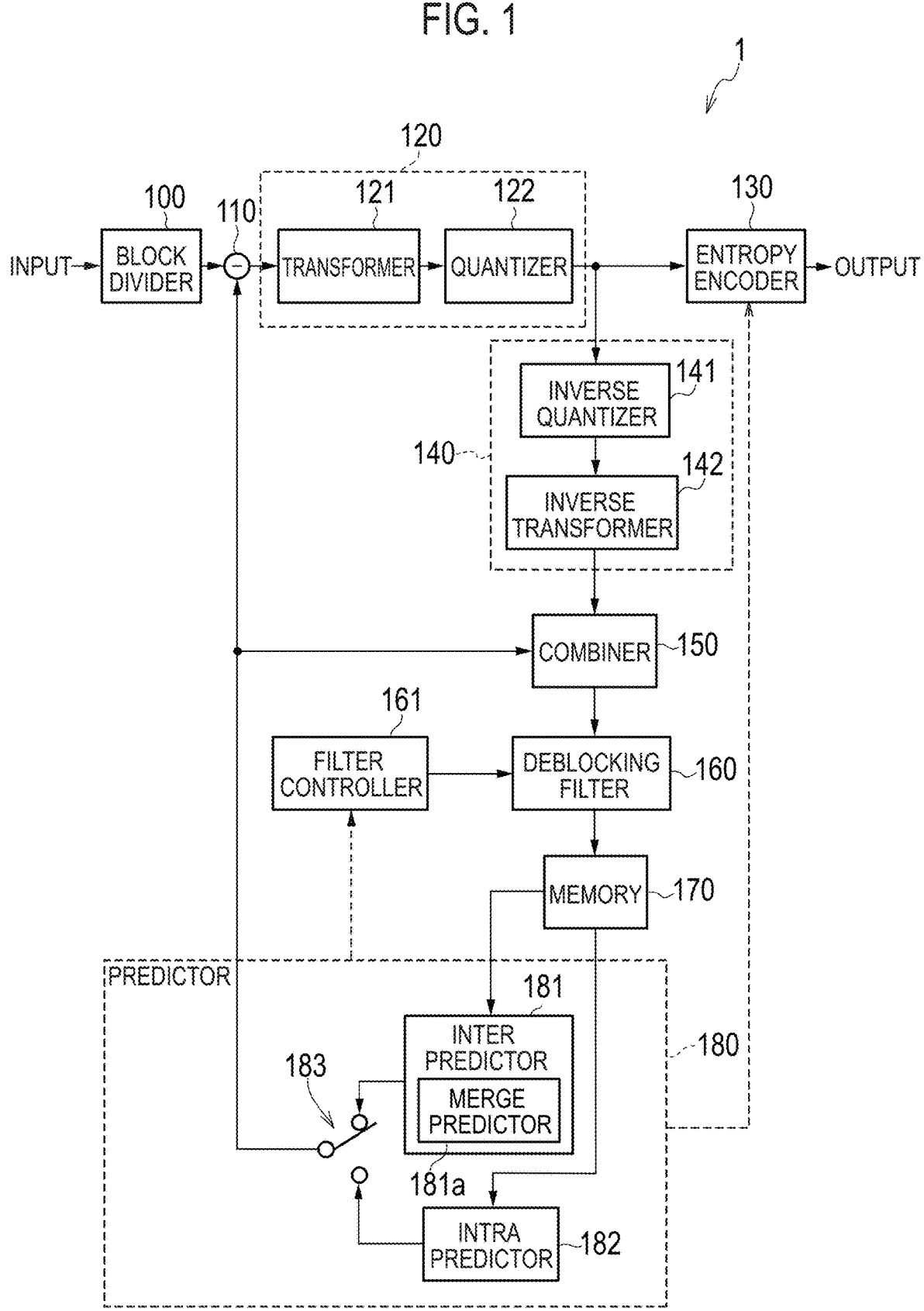
FIG. 1 is a diagram illustrating the configuration of an encoding device according to an embodiment.
Figure 3:
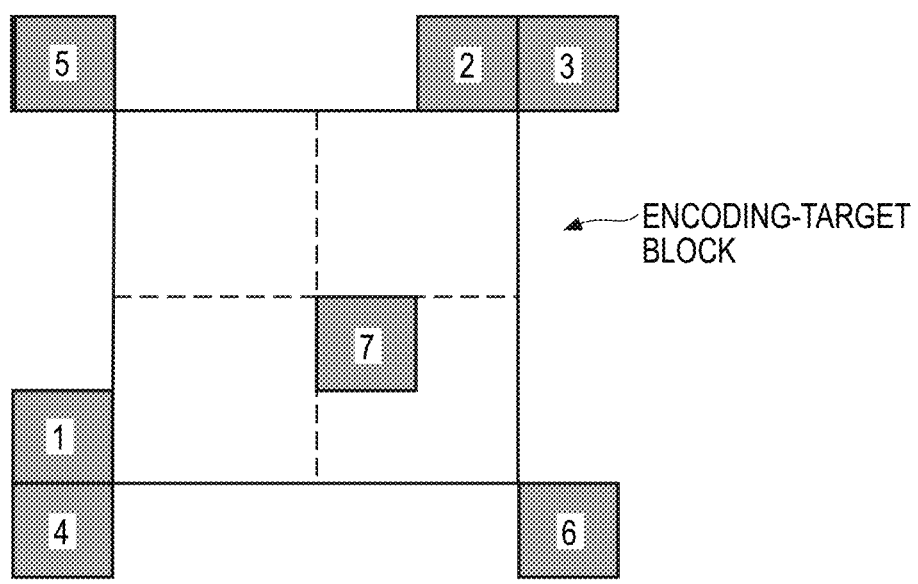
FIG. 3 is a diagram illustrating operation of a merge predictor according to the embodiment.

A configuration of an encoding device according to the present embodiment will be described first. FIG. 1 is a diagram illustrating a configuration of an encoding device 1 according to the present embodiment. The encoding device 1 is a device that performs encoding on each of blocks obtained by dividing an image.

As illustrated in FIG. 1, the encoding device 1 includes a block divider 100, a subtractor 110, a transformer/quantizer 120, an entropy encoder 130, an inverse quantizer/inverse transformer 140, a combiner 150, a deblocking filter 160, a filter controller 161, a memory 170, and a predictor 180.

The block divider 100 divides an input image given in the form of a frame (or a picture) that constitutes a part of a video into a plurality of image blocks and outputs the resulting image blocks to the subtractor 110. The size of the image blocks may be 32×32 pixels, 16×16 pixels, 8×8 pixels, or 4×4 pixels. The shape of the image blocks is not limited to square and may be rectangular (non-square). The image block is a unit (encoding-target block) in which the encoding device 1 performs encoding and is a unit (decoding-target block) in which a decoding device performs decoding. Such an image block is sometimes referred to as a CU (Coding Unit).

The block divider 100 performs block division on a luminance signal and a chrominance signal. Although a following description is given mainly of a case in which shapes made by the block division are identical for the luminance signal and the chrominance signal, the division may be controllable independently for the luminance signal and the chrominance signal. A luminance block and a chrominance block are simply referred to as an encoding-target block when the blocks are not particularly distinguished from each other.

The subtractor 110 calculates prediction residuals that represent differences (errors) between an encoding-target block outputted from the block divider 100 and a prediction block obtained by the predictor 180 predicting the encoding-target block. The subtractor 110 calculates a prediction residual by subtracting each pixel value in the prediction block from each pixel value in the block, and outputs the calculated prediction residuals to the transformer/quantizer 120.

The transformer/quantizer 120 performs a transform process and a quantization process on each of blocks. The transformer/quantizer 120 includes a transformer 121 and a quantizer 122.

The transformer 121 calculates transform coefficients for each frequency component by performing a transform process on the prediction residual outputted from the subtractor 110 and outputs the calculated transform coefficients to the quantizer 122. The transform process (transformation) is a process of transforming a pixel-domain signal into a frequency-domain signal and includes, for example, discrete cosine transform (DCT), discrete sine transform (DST), Karhunen Loeve transform (KLT), an integer transform based on any one of such transforms, or the like.

The quantizer 122 quantizes the transform coefficients outputted from the transformer 121 by using a quantization parameter (Qp) and a quantization matrix, and outputs the quantized transform coefficients to the entropy encoder 130 and the inverse quantizer/inverse transformer 140. The quantization parameter (Qp) is a parameter that is applied in common to each transform coefficient in a block, and is a parameter that determines quantization granularity. The quantization matrix is a matrix that has, as elements, quantization values used when each transform coefficient is quantized.

The entropy encoder 130 performs entropy encoding on the transform coefficients outputted from the quantizer 122, generates an encoded stream (bit stream) by performing data compression, and outputs the encoded stream to an outside of the encoding device 1. For the entropy encoding, Huffman coding, CABAC (Context-based Adaptive Binary Arithmetic Coding), or the like can be used. Also, the entropy encoder 130 acquires information on the size, the shape and the like of each encoding-target block from the block divider 100, acquires information related to prediction (for example, information on a prediction mode and a motion vector) from the predictor 180, and performs encoding also on the information.

The inverse quantizer/inverse transformer 140 performs an inverse quantization process and an inverse transform process on each of blocks. The inverse quantizer/inverse transformer 140 includes an inverse quantizer 141 and an inverse transformer 142.

The inverse quantizer 141 performs the inverse quantization process corresponding to the quantization process performed by the quantizer 122. More specifically, the inverse quantizer 141 inverse quantizes the transform coefficients outputted from the quantizer 122 by using the quantization parameter (Qp) and the quantization matrix to restore the transform coefficients, and outputs the restored transform coefficients to the inverse transformer 142.

The inverse transformer 142 performs the inverse transform process corresponding to the transform process performed by the transformer 121. For example, when the transformer 121 performs DCT, the inverse transformer 142 performs inverse DCT. The inverse transformer 142 restores the prediction residual by performing the inverse transform process on the transform coefficients outputted from the inverse quantizer 141 and outputs a restoration prediction residual that is the restored prediction residual to the combiner 150.

The combiner 150 combines the restoration prediction residual outputted from the inverse transformer 142 with a prediction block outputted from the predictor 180, on a pixel-by-pixel basis. The combiner 150 reconstructs (decodes) an encoding-target block by adding individual pixel values of the restoration prediction residual to individual pixel values of the prediction block and outputs a decoded image (reconstructed block) on each of reconstructed blocks to the deblocking filter 160.

The deblocking filter 160 performs a filter process on a block boundary between two blocks including a reconstructed block and a block adjacent to the reconstructed block (hereinafter, referred to as a "target block pair") and outputs the reconstructed block after the filter process to the memory 170. The filter process is a process for mitigating signal deterioration caused by the block-based processes and is a filter process of smoothing a signal gap at the block boundary of a target block pair. The deblocking filter 160 is configured, in general, as a low-pass filter that makes signal changes more gradual.

The filter controller 161 controls the deblocking filter 160. More specifically, the filter controller 161 controls boundary strength (Bs) indicating whether or not the filter process is performed on a block boundary of the target block pair, and filter strength of the deblocking filter 160. The boundary strength Bs refers to a parameter for determining whether or not the filter process is applied and a type of the filter process. Note that control of whether or not a filter process is performed can be regarded as control of whether the boundary strength Bs is set to one or more, or to zero.

The filter controller 161 controls the deblocking filter 160, based on variations of pixel values in an area near the boundary of the target block pair, the prediction mode, the quantization parameter, and values of motion vectors used in motion-compensated prediction (inter prediction). Operation of the filter controller 161 will be described in detail later.

The memory 170 accumulates reconstructed blocks outputted from the deblocking filter 160 as decoded images in units of frames. The memory 170 outputs the stored decoded images to the predictor 180.

The predictor 180 generates a prediction block corresponding to an encoding-target block by performing a prediction process in units of the block, and outputs the generated prediction block to the subtractor 110 and the combiner 150. The predictor 180 includes an inter predictor 181, an intra predictor 182 and a switcher 183.

The inter predictor 181 calculates a motion vector through a scheme such as block matching by using, for a reference image, a decoded image stored in the memory 170, generates an inter prediction block by predicting an encoding-target block, and outputs the generated inter prediction block to the switcher 183. The inter predictor 181 selects an optimal inter prediction method, from inter prediction using a plurality of reference images (typically, bi-prediction) and inter prediction using one reference image (uni-directional prediction), and performs inter prediction by using the selected inter prediction method. The inter predictor 181 outputs information related to inter prediction (the motion vector and the like) to the entropy encoder 130 and the filter controller 161.

In the present embodiment, the inter predictor 181 includes a merge predictor 181a that performs triangle merge prediction. The merge predictor 181a divides an encoding-target block into two triangular areas, predicts the two triangular areas using two motion vectors to generate two triangular prediction areas (two area prediction images) and generates a prediction block of the encoding-target block by merging areas of boundaries of the generated two triangular prediction areas through weighted averaging. The triangle merge prediction will be described in detail later.

The intra predictor 182 selects an optimal intra prediction mode to be applied to an encoding-target block from among a plurality of intra prediction modes, and predicts the encoding-target block by using the selected intra prediction mode. The intra predictor 182 generates an intra prediction block by referencing decoded pixel values adjacent to the encoding-target block of a decoded image stored in the memory 170, and outputs the generated intra prediction block to the switcher 183. The intra predictor 182 outputs information related to the selected intra prediction mode to the entropy encoder 130 and the filter controller 161.

The switcher 183 switches the prediction block between the inter prediction block outputted from the inter predictor 181 and the intra prediction block outputted from the intra predictor 182 and outputs one of the prediction blocks to the subtractor 110 and the combiner 150.

As described above, the encoding device 1 according to the present embodiment includes the merge predictor 181a configured to generate area prediction images using motion vectors respectively for a plurality of divided areas obtained by dividing an encoding-target block, and merge areas of boundaries among a plurality of the generated area prediction images through weighted averaging to generate a prediction block of the encoding-target block, the transformer/quantizer 120 configured to perform a transform process and a quantization process on a prediction residual that represents a difference between the encoding-target block and the prediction block, the inverse quantizer/inverse transformer 140 configured to restore the prediction residual by performing an inverse quantization process and an inverse transform process on transform coefficients obtained by the transformer/quantizer, the combiner 150 configured to reconstruct the encoding-target block by combining the restored prediction residual and the prediction block, and the deblocking filter 160 configured to perform a filter process on a block boundary between two blocks including the reconstructed encoding-target block and an adjacent block.

Operation of the merge predictor 181a according to the present embodiment will be described next. FIG. 2A and FIG. 2B to FIG. 5 are diagrams illustrating operation of the merge predictor 181a according to the present embodiment.

As illustrated in FIG. 2A and FIG. 2B, first, the merge predictor 181a divides an encoding-target block into two triangular areas (Partition 1, Partition 2). The division method includes two types of a method illustrated in FIG. 2A and a method illustrated in FIG. 2B. In the method illustrated in FIG. 2A, the merge predictor 181a divides the encoding-target block with a dividing line that passes through an upper left vertex position and a lower right vertex position of the encoding-target block. In the method illustrated in FIG. 2B, the merge predictor 181a divides the encoding-target block with a dividing line that passes an upper right vertex position and a lower left vertex position of the encoding-target block.

Second, the merge predictor 181a sets a motion vector for each triangular area using references of motion vectors as candidates. The merge predictor 181a arranges motion vectors among seven types of candidates indicated in 1 to 7 in FIG. 3 in prescribed order of priority and selects one type of a motion vector from the top five motion vectors for each triangular area.

Figure 4:
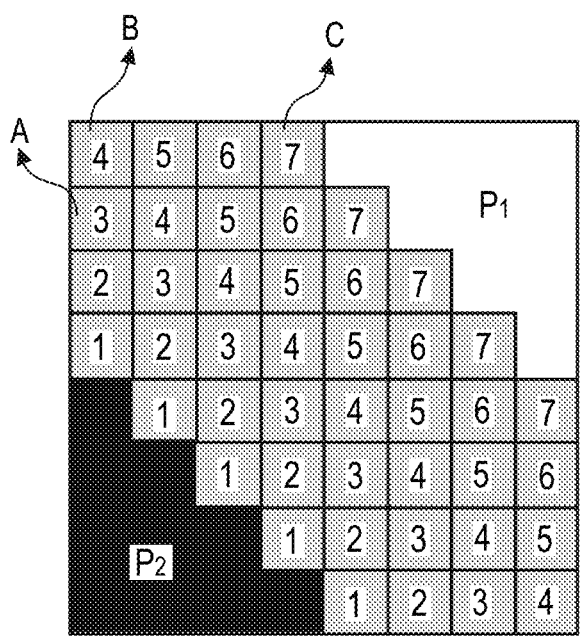
FIG. 4 is a diagram illustrating operation of a merge predictor according to the embodiment.

Third, the merge predictor 181a generates a prediction image (prediction block) of the encoding-target block by performing motion-compensated prediction for each triangular area using the motion vector of each triangular area, and then, merging the prediction images for each triangular area (hereinafter, referred to as "area prediction images"). At this time, as illustrated in FIG. 4, discontinuity of the boundary between two area prediction images is prevented by smoothly merging the two area prediction images at the boundary through weighted averaging.

More specifically, a prediction image in the triangle merge prediction is obtained by merging a prediction image 1 ("$P_1$" in FIG. 4) generated with a motion vector to be applied to Partition 1 in the encoding-target block and a prediction image 2 ("$P_2$" in FIG. 4) generated with a motion vector to be applied to Partition 2, using a weight map in accordance with a block size and a block shape of the encoding-target block. Note that in FIG. 4, an area including pixels to which weighted coefficients of one of "1" to "7" are set is a merged area to be merged through weighted averaging.

Note that the encoding-target block may be divided into areas of 4×4 pixels (4×4 units) and whether or not the area is a merged area may be determined for each of 4×4 units. Whether or not each of 4×4 units is the merged area may be determined such that each of 4×4 units is determined as the merged area when weighted coefficients set to the pixels in the 4×4 units include at least one of "1" to "7", and determined as the merged area when the weighted coefficients set to the pixels in the 4×4 units do not include "0" or "8".

Fourth, the merge predictor 181a stores the motion vectors used in the triangle merge prediction in the motion vector storage. More specifically, there is a case where the motion vectors used in the encoding-target block are reutilized upon encoding of an adjacent block, and thus, the motion vectors are stored in the motion vector storage for reutilization of the motion vectors. The motion vector storage is provided in the merge predictor 181a or the memory 170.

More specifically, the merge predictor 181a divides the encoding-target block into areas of 4×4 pixels and prepares the motion vector storage for each of the 4×4 units. The merge predictor 181a stores information regarding the corresponding motion vectors, that is, reference directions of the motion vectors, information indicating reference frames of the motion vectors, the number of motion vectors (indicating either uni-prediction or bi-prediction), values of the motion vectors, and the like, in the motion vector storage.

Figure 5:
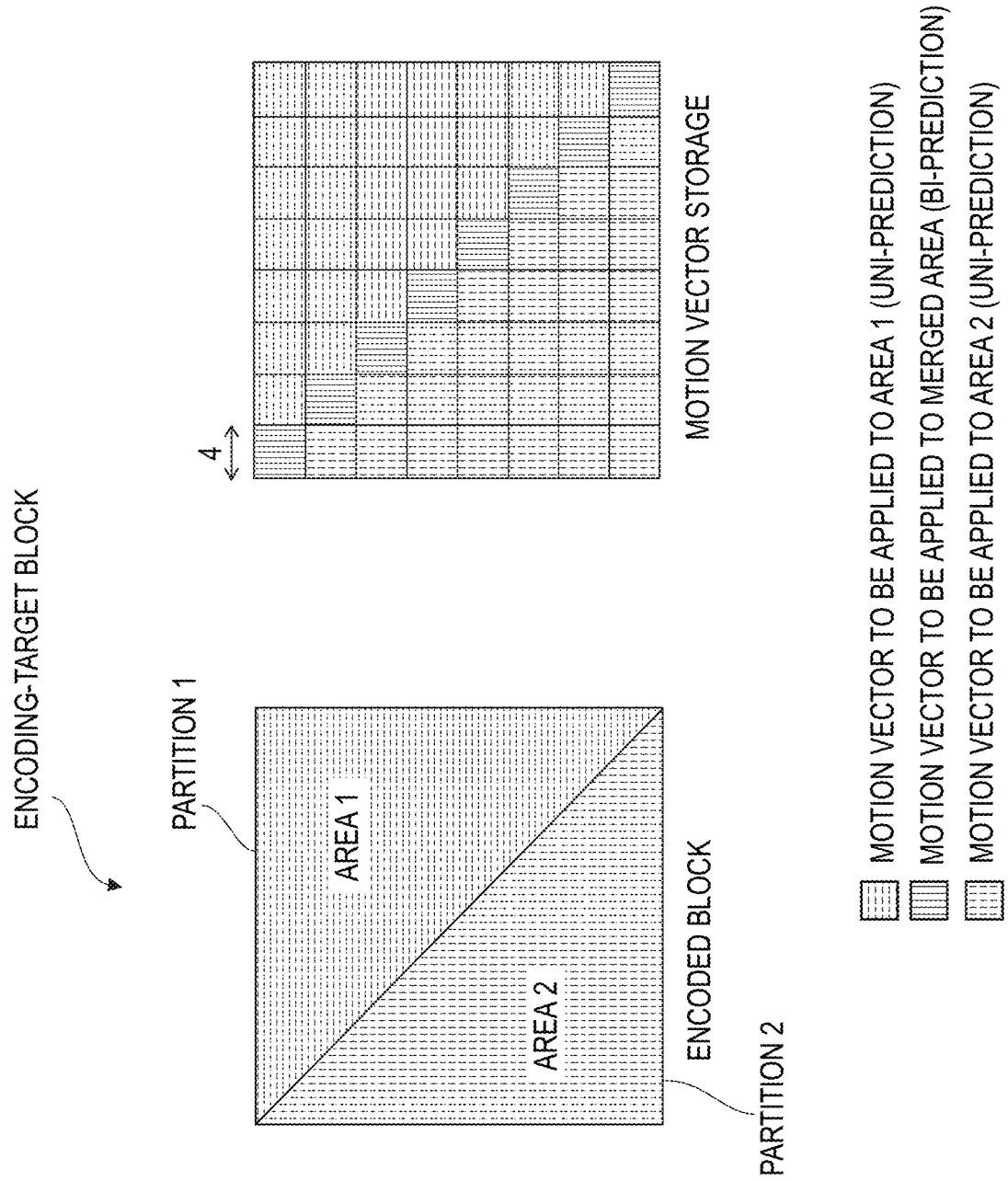
FIG. 5 is a diagram illustrating operation of a merge predictor according to the embodiment.

As illustrated in FIG. 5, an area of a boundary between Partition 1 (area 1) and Partition 2 (area 2) of the encoding-target block, that is, an area near a diagonal line of the encoding-target block is a merged area merged through weighted averaging. For each of 4×4 units included in such a merged area, when reference directions of the motion vectors applied to Partition 1 and Partition 2 are different, the merge predictor 181a determines that prediction is bi-prediction and stores information regarding two motion vectors of the motion vector used in Partition 1 and the motion vector used in Partition 2 in the motion vector storage. On the other hand, when the reference directions of the motion vectors applied to Partition 1 and Partition 2 are the same, the merge predictor 181a determines that the prediction is uni-prediction and stores information regarding the motion vector used in Partition 2 in the motion vector storage.

Meanwhile, the merge predictor 181a determines that the prediction is uni-prediction for each of 4×4 units included in an area to which weighted averaging is not applied in Partition 1 and stores information regarding one motion vector used in Partition 1 in the motion vector storage. Further, the merge predictor 181a determines that the prediction is uni-prediction for each of 4×4 units included in an area to which weighted averaging is not applied in Partition 2 and stores information regarding one motion vector used in Partition 2 in the motion vector storage.

Note that FIG. 4 and FIG. 5 illustrate a case where the encoding-target block is diagonally divided into areas, and when the encoding-target block is reverse-diagonally divided into areas, the motion vector information is stored in the motion vector storage so that the areas are inverted in a line-symmetric manner.

Figure 6:
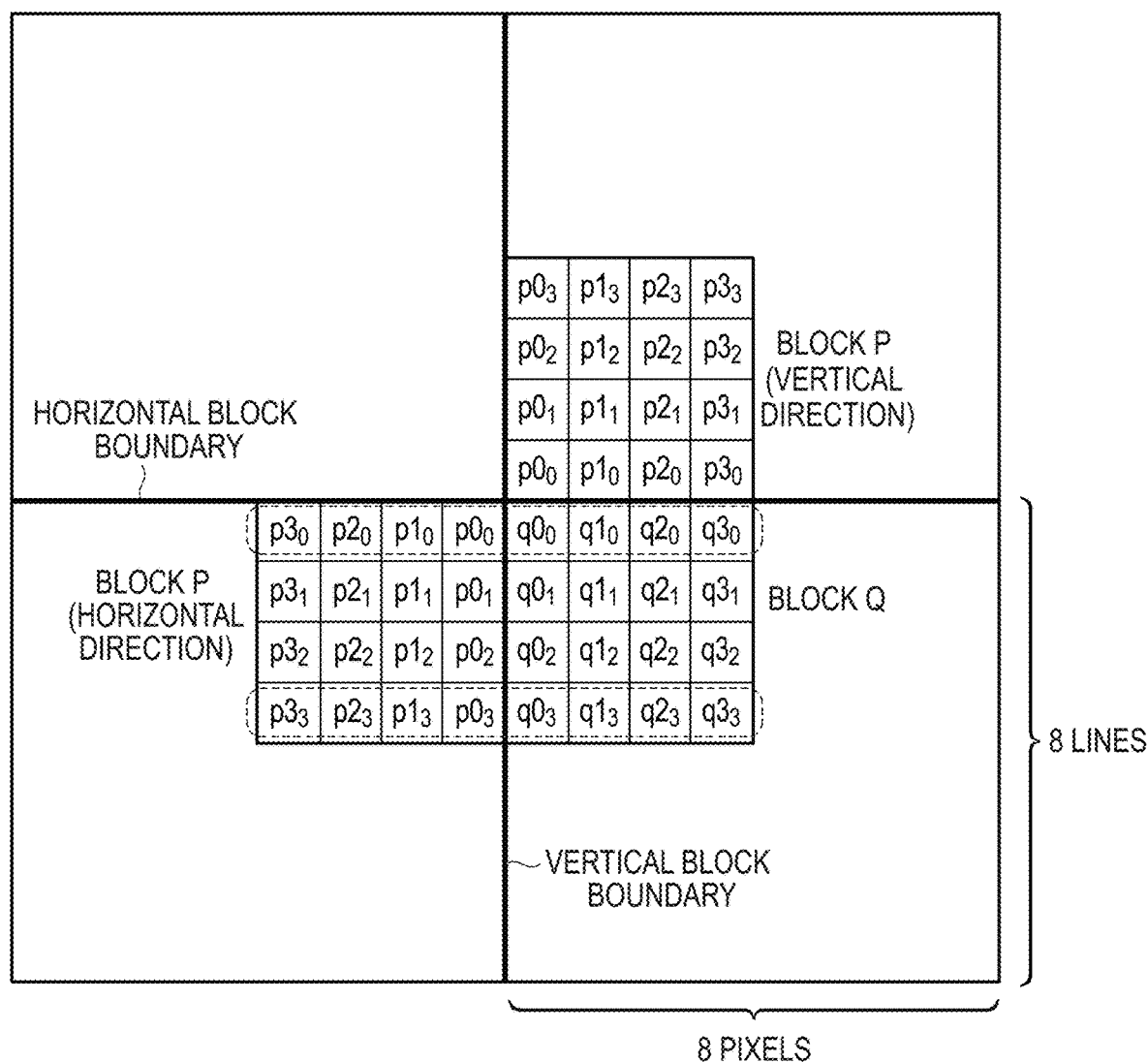
FIG. 6 is a diagram illustrating an example of operation of a deblocking filter according to the embodiment.

Operation of the deblocking filter 160 and the filter controller 161 according to the present embodiment will be described next. FIG. 6 is a diagram illustrating an example of operation of the deblocking filter 160 according to the present embodiment.

In the example illustrated in FIG. 6, the deblocking filter 160 performs a filter process on a block boundary for each of blocks of 8×8 pixels. Further, the deblocking filter 160 performs a filter process in units of four rows or four columns Blocks P and Q illustrated in FIG. 6 are one unit in which the deblocking filter 160 performs the filter process and have a block size of 4×4 pixels as an example. Each of the blocks P and Q may be referred to as a sub-block.

The filter controller 161 obtains boundary strength Bs, for example, based on Table 1 below. In the present embodiment, it is assumed that the value of the boundary strength Bs is any one of 0, 1, 2. Note that boundary strength may be calculated for each of blocks of a luminance signal and a chrominance signal, or determination may be performed using a combination of the boundary strength of the blocks of the luminance signal and the chrominance signal as one boundary strength.

TABLE 1

| Bs value | Conditions for determining Bs value |
| --- | --- |
| 2 | Intra prediction is applied to at least one of blocks |
| 1 | At least one of blocks belongs to merged area of triangle merge prediction |
| 1 | At least one of blocks includes non-zero transform coefficient |
| 1 | The numbers of motion vectors or reference images of both blocks are different |
| 1 | Difference between motion vectors of both blocks is equal to or greater than threshold value |
| 0 | Other than above |

As illustrated in FIG. 6 and Table 1, the filter controller 161 sets the value of Bs to 2 when intra prediction is applied to at least one of the blocks P and Q.

The filter controller 161 sets the value of Bs to 1 when inter prediction is applied to both of the blocks P and Q, and when at least one condition of the following (a) to (d) is satisfied, and otherwise sets the value of Bs to 0.

(a) At least one of the blocks P and Q belongs to a merged area of triangle merge prediction (in other words, a boundary between the blocks P and Q is adjacent to the merged area of the triangle merge prediction).

(b) At least one of the blocks P and Q includes a significant transform coefficient (that is, a non-zero coefficient).

(c) The number of motion vectors or reference images of the blocks P and Q are different.

(d) An absolute value of a difference between motion vectors of the blocks P and Q is equal to or greater than a threshold value (for example, one pixel).

However, the filter controller 161 can change order of priority in which conditions indicated in Table 1 are to be applied within a range in which a Bs value to be determined as a result does not become different.

When the value of the boundary strength Bs is 0, the filter controller 161 controls the deblocking filter 160 such that the filter process is not performed. Hereinafter, a description is given, taking the boundary between vertical blocks illustrated in FIG. 6 as an example.

When the value of the boundary strength Bs is 1 or 2, the filter controller 161 may control the deblocking filter 160 such that the filter process is performed only when the following expression (1) is satisfied.

[Expression 1]

$$|p2_0-2p1_0+p0_0|+|p2_3-2p1_3+p0_3|+|q2_0-2q1_0+q0_0|+|q2_3-2q1_3+q0_3|<\beta \quad (1)$$

Note that when the filter process is performed, the filter controller 161 may apply a stronger filter when all of the following conditional expressions (2) to (7) are satisfied, and otherwise, apply a weaker filter.

[Expression 2]

$$2(|p2_0-2p1_0+p0_0|+|q2_0-2q1_0+q0_0|)<\beta/4 \quad (2)$$

$$2(|p2_3-2p1_3+p0_3|+|q2_3+q0_3|)<\beta/4 \quad (3)$$

$$|p3_0-p0_0|+|q0_0-q3_0|<\beta/8 \quad (4)$$

$$|p3_3-p0_3|+|q0_3-q3_3|<\beta/8 \quad (5)$$

$$|p0_0-q0_0|<(5t_C+1)/2 \quad (6)$$

$$|p0_3-q0_3|<(5t_C+1)/2 \quad (7)$$

However, a threshold value $\beta$ and a value $t_C$ change according to an average value $Q_{av}$ of the quantization parameter of the adjacent blocks P and Q.

As described above, the filter controller 161 according to the present embodiment controls the deblocking filter based on a position of the merged area merged by the merge predictor 181a through weighted averaging as in the above-described (a). More specifically, when the block boundary between the blocks P and Q (two sub-blocks) is adjacent to the merged area, the filter controller 161 controls the deblocking filter such that the filter process is performed on the block boundary.

As described above, by determining continuity between blocks while taking into account the position of the merged area in the triangle merge prediction, it is possible to prevent discontinuity of the block boundary due to the merged area through the deblocking filter process, so that it is possible to prevent deterioration in visual terms.

Figure 7:
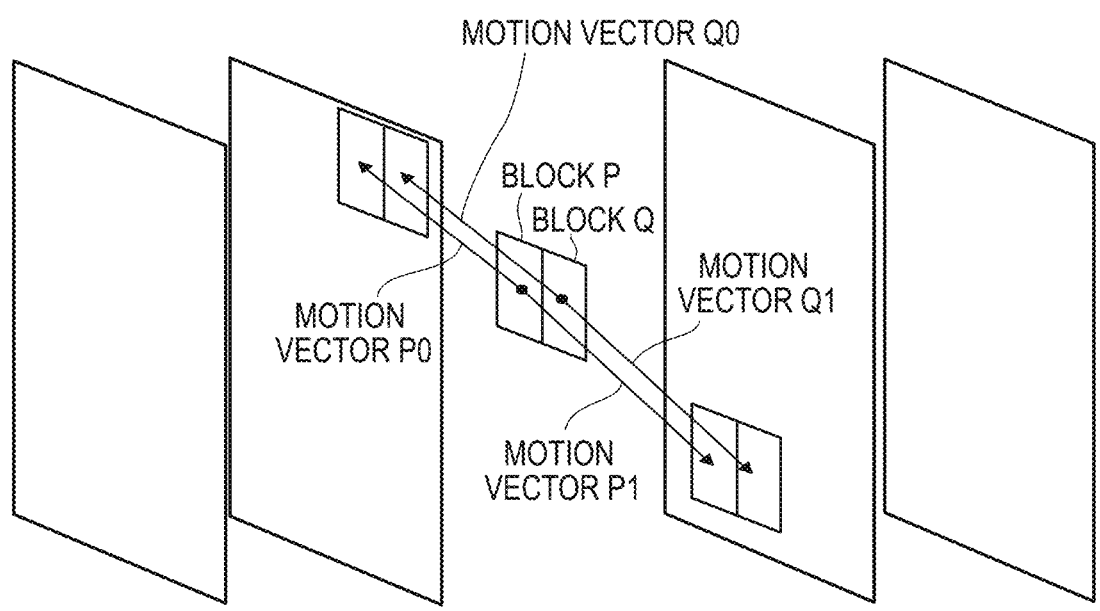
FIG. 7 is a diagram explaining a specific example of the operation of a filter controller according to the embodiment.

A specific example of operation of the filter controller 161 according to the present embodiment will be described next. FIG. 7 is a diagram for explaining a specific example of operation of the filter controller 161 according to the present embodiment.

As illustrated in FIG. 7, it is assumed that prediction applied to the blocks P and Q is both bi-prediction. Further, neither of the blocks P and Q includes a non-zero transform coefficient.

Two motion vectors to be used by the block P in bi-prediction are P0 and P1. Two motion vectors to be used by the block Q in bi-prediction are Q0 and Q1. P0 and Q0 refer to the same frame, and P1 and Q1 refer to the same frame. Further, a difference between the values of the motion vectors of P0 and Q0 is equal to or less than the threshold value, and a difference between the values of the motion vectors of P1 and Q1 is equal to or less than the threshold value.

In such a case, none of the above-described conditions (b) to (d) is satisfied. However, when at least one of the blocks P and Q is the merged area in the triangle merge prediction, discontinuity is highly likely to occur at the boundary between the blocks P and Q.

In the present embodiment, the above-described condition (a) is newly introduced. Thus, when at least one of the blocks P and Q is the merged area in the triangle merge prediction, it is possible to perform control such that the filter process is performed on the boundary between the blocks P and Q, so that it is possible to prevent discontinuity of the boundary between the blocks P and Q.

Figure 8:
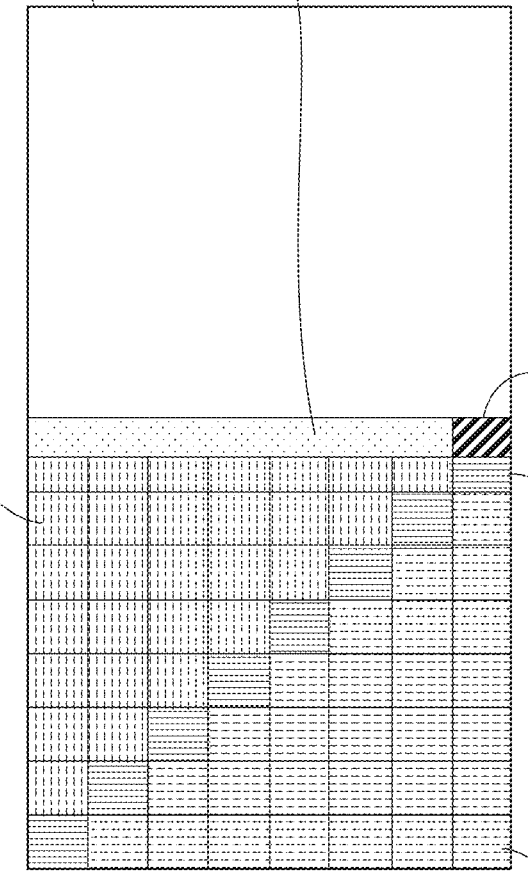
FIG. 8 is a diagram illustrating a specific example of the deblocking filter and the filter controller according to the embodiment.

A specific example of operation of the deblocking filter 160 and the filter controller 161 according to the present embodiment will be described next. FIG. 8 is a diagram illustrating a specific example of the operation of the deblocking filter 160 and the filter controller 161 according to the present embodiment.

As illustrated in FIG. 8, the filter controller 161 performs a filter process in units of two sub-blocks (blocks P and Q) across the block boundary for the block boundary between the encoding-target block and an adjacent block adjacent to the encoding-target block. Here, when a sub-block boundary between two sub-blocks (blocks P and Q) is adjacent to the merged area in the triangle merge prediction, the filter controller 161 controls the deblocking filter 160 such that the filter process is performed on the sub-block boundary.

More specifically, when the triangle merge prediction is applied to at least one of the two sub-blocks (blocks P and Q), the filter controller 161 acquires motion vector information of 4×4 units at positions corresponding to the sub-blocks with reference to the motion vector storage and determines whether or not two motion vectors are stored (that is, bi-prediction). When the two motion vectors are stored, the sub-blocks belong to the merged area in the triangle merge prediction. In such a case, the filter controller 161 controls the deblocking filter 160 such that the filter process is performed on the sub-block boundary between the two sub-blocks (blocks P and Q).

Meanwhile, when one motion vector is stored in motion vector information of 4×4 units at positions corresponding to the sub-blocks in the acquired motion vector information (that is, uni-prediction), the filter controller 161 determines whether or not the sub-blocks belong to the merged area based on weighted coefficients set to the pixels within the sub-blocks.

More specifically, when weighted coefficients set to the pixels included in the sub-blocks do not include "0" or "8", it is determined that the area is the merged area, and when the weighted coefficients include "0" or "8", it is determined that the area is not the merged area. The weighted coefficients can be uniquely determined based on a size and a shape of the encoding-target block, and a division shape of the triangular area, and thus, a system may prepare a merged area determination table for each size and shape of the encoding-target block and for each division shape of the triangular area in advance and determination may be performed with reference to the merged area determination table.

As described above, even when the acquired motion vector information is uni-prediction, when it is determined that the sub-blocks are included in the merged area, the filter controller 161 controls the deblocking filter 160 such that the filter process is performed on the sub-block boundary between two sub-blocks (blocks P and Q). Meanwhile, when the acquired motion vector information is uni-prediction, and the sub-blocks are not included in the merged area, the filter controller 161 controls whether or not the filter process is performed on the sub-block boundary based on at least one of whether or not a non-zero transform coefficient exists in each of the two sub-blocks and information regarding the motion vectors of the two sub-blocks.

On the other hand, when the sub-block boundary between the two sub-blocks (blocks P and Q) is not adjacent to the merged area in the triangle merge prediction, the filter controller 161 controls whether or not the filter process is performed on the sub-block boundary based on at least one of whether a non-zero transform coefficient exists in each of the two sub-blocks and information regarding the motion vectors of the two sub-blocks.

<Configuration of Decoding Device>

Figure 9:
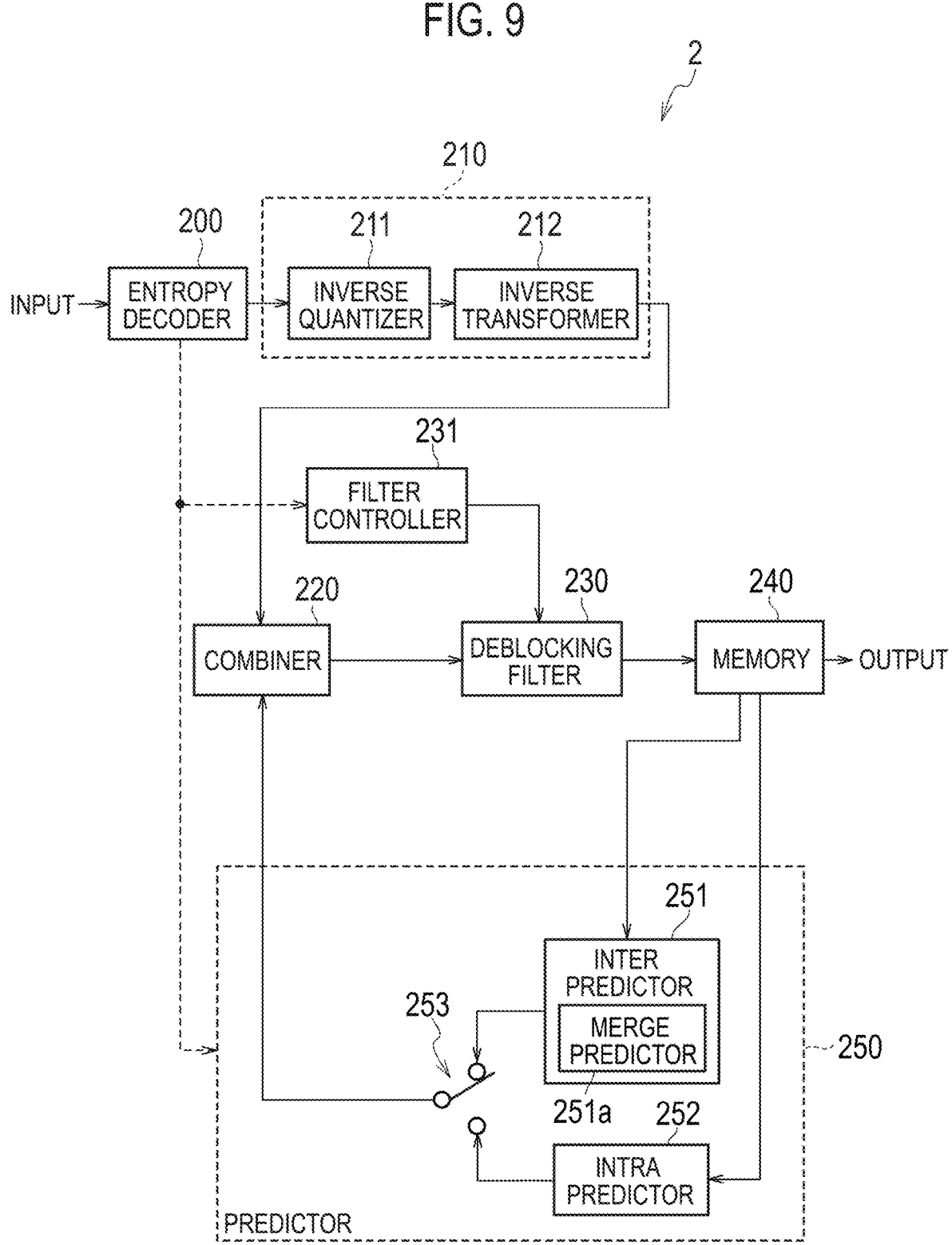
FIG. 9 is a diagram illustrating the configuration of a decoding device according to the embodiment.

Next, a configuration of a decoding device according to the present embodiment will be described, focusing mainly on differences from the configuration of the encoding device described above. FIG. 9 is a diagram illustrating a configuration of a decoding device 2 according to the present embodiment. The decoding device 2 is a device that decodes a decoding-target block from an encoded stream.

As illustrated in FIG. 9, the decoding device 2 includes an entropy decoder 200, an inverse quantizer/inverse transformer 210, a combiner 220, a deblocking filter 230, a filter controller 231, a memory 240, and a predictor 250.

The entropy decoder 200 decodes various signaling information by decoding an encoded stream generated by the encoding device 1. More specifically, the entropy decoder 200 acquires information related to prediction applied to a decoding-target block (for example, prediction type information, motion vector information) and outputs the acquired information to the predictor 250 and the filter controller 231.

The entropy decoder 200 decodes the encoded stream, acquires quantized transform coefficients, and outputs the acquired transform coefficients to the inverse quantizer/inverse transformer 210 (inverse quantizer 211).

The inverse quantizer/inverse transformer 210 performs an inverse quantization process and an inverse transform process on each of blocks. The inverse quantizer/inverse transformer 210 includes an inverse quantizer 211 and an inverse transformer 212.

The inverse quantizer 211 performs the inverse quantization process corresponding to the quantization process performed by the quantizer 122 of the encoding device 1. The inverse quantizer 211 inverse-quantizes the quantized transform coefficients outputted from the entropy decoder 200 by using the quantization parameter (Qp) and the quantization matrix to restore transform coefficients in the decoding-target block, and outputs the restored transform coefficients to the inverse transformer 212.

The inverse transformer 212 performs an inverse transform process corresponding to the transform process performed by the transformer 121 of the encoding device 1. The inverse transformer 212 restores the prediction residual by performing the inverse transform process on the transform coefficients outputted from the inverse quantizer 211 and outputs the restored prediction residual (restoration prediction residual) to the combiner 220.

The combiner 220 reconstructs (decodes) the decoding-target block by combining the prediction residual outputted from the inverse transformer 212 and a prediction block outputted from the predictor 250 on a pixel-by-pixel basis, and outputs a reconstructed block to the deblocking filter 230.

The deblocking filter 230 performs operation similar to the operation of the deblocking filter 160 of the encoding device 1. The deblocking filter 230 performs a filter process on the boundary of a target block pair including the reconstructed block outputted from the combiner 220 and a block adjacent to the reconstructed block and outputs the reconstructed block after the filter process to the memory 240.

The filter controller 231 performs operation similar to the operation of the filter controller 161 of the encoding device 1, based on the information outputted from the entropy decoder 200. The filter controller 231 selects boundary strength Bs, for example, through the method illustrated in Table 1 and controls the deblocking filter 230 according to the selected boundary strength Bs.

The memory 240 stores the reconstructed blocks outputted from the deblocking filter 230 as decoded images in units of frames. The memory 240 outputs the decoded images in units of frames to an outside of the decoding device 2.

The predictor 250 performs prediction on each of blocks. The predictor 250 includes an inter predictor 251, an intra predictor 252 and a switcher 253.

The inter predictor 251 predicts a decoding-target block through inter prediction by using, for a reference image, a decoded image stored in the memory 240. The inter predictor 251 generates an inter prediction block by performing inter prediction, by using the motion vector information outputted from the entropy decoder 200, and outputs the generated inter prediction block to the switcher 253.

In the present embodiment, the inter predictor 251 includes a merge predictor 251*a* that performs the triangle merge prediction. The merge predictor 251*a* divides the decoding-target block into two triangular areas, predicts the two triangular areas using two motion vectors to generate two triangular prediction areas and generates a prediction block of the encoding-target block by merging areas at the boundaries between the generated two triangular prediction areas through weighted averaging.

Operation of the merge predictor 251a is similar to the operation of the merge predictor 181a of the encoding device 1. However, a flag indicating that the triangle merge prediction is applied, a flag indicating a division method (FIG. 2A or FIG. 2B) of the triangle merge prediction, and the like, are signaled from the encoding device 1 to the decoding device 2 with an encoded stream. The merge predictor 251a performs the triangle merge prediction based on the signaled information.

The intra predictor 252 references reference pixels adjacent to a decoding-target block of a decoded image stored in the memory 240, and predicts the decoding-target block through intra prediction, based on the information outputted from the entropy decoder 200. The intra predictor 252 generates an intra-prediction block, and outputs the generated intra prediction block to the switcher 253.

The switcher 253 switches the prediction block between the inter prediction block outputted from the inter predictor 251 and the intra prediction block outputted from the intra predictor 252 and outputs one of the prediction blocks to the combiner 220.

As described above, the decoding device 2 according to the present embodiment includes the entropy decoder 200 configured to output transform coefficients corresponding to a decoding-target block by decoding an encoded stream, the inverse quantizer/inverse transformer 210 configured to restore a prediction residual by performing an inverse quantization process and an inverse transform process on the transform coefficients outputted by the entropy decoder 200, the merge predictor 251a configured to generate area prediction images using motion vectors of a plurality of divided areas obtained by dividing the decoding-target block and merge areas at boundaries of a plurality of the generated area prediction images to generate a prediction block of the decoding-target block, the combiner 220 configured to combine the restored prediction residual and the prediction block to reconstruct the decoding-target block, and the deblocking filter 230 configured to perform a filter process on a block boundary between two blocks including the reconstructed decoding-target block and an adjacent block.

Further, the deblocking filter 230 performs the filter process in units of two sub-blocks (blocks P and Q) across the block boundary. When a sub-block boundary between the two sub-blocks is adjacent to the merged area in the triangle merge prediction, the filter controller 231 controls the deblocking filter 230 such that the filter process is performed on the sub-block boundary.

Meanwhile, when the sub-block boundary between the two sub-blocks (blocks P and Q) is not adjacent to the merged area in the triangle merge prediction, the filter controller 231 controls whether or not the filter process is performed on the sub-block boundary based on at least one of whether or not a non-zero transform coefficient exists in each of the two sub-blocks and information regarding motion vectors of the two sub-blocks.

Example of Operation of Filter Controller

Figure 10:
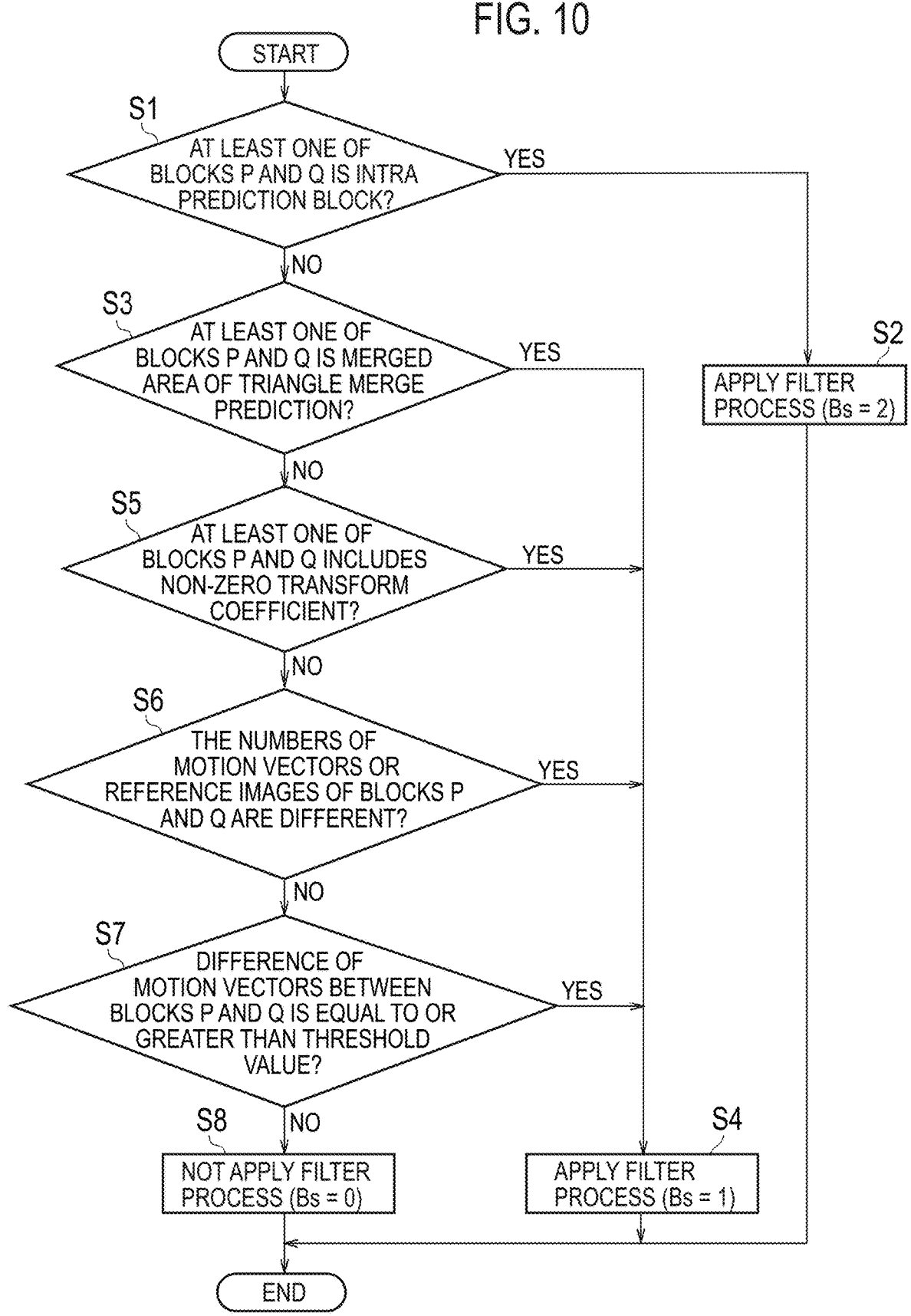
FIG. 10 is a diagram illustrating an example of the operation flow of the filter controller according to the embodiment.

Next, an example of the operation of the filter controllers 161 and 231 according to the present embodiment is described. Since the filter controllers 161 and 231 perform the same operation, a description is given by taking the filter controller 231 as an example. FIG. 10 is a diagram illustrating the example of the operation flow of the filter controller 231 according to the present embodiment.

As illustrated in FIG. 10, in step S1, the filter controller 231 determines whether or not intra prediction is applied to at least one of the blocks P and Q. When intra prediction is applied to at least one of the blocks P and Q (step S1: YES), in step S2, the filter controller 231 controls the deblocking filter 230 such that the filter process is performed. More specifically, the filter controller 231 selects the boundary strength Bs=2.

When intra prediction is applied to neither the block P nor the block Q (step S1: NO), that is, when inter prediction is applied to both of the blocks P and Q, in step S3, the filter controller 231 determines whether or not at least one of the blocks P and Q belongs to the merged area in the triangle merge prediction. When at least one of the blocks P and Q belongs to the merged area in the triangle merge prediction (step S3: YES), in step S4, the filter controller 231 controls the deblocking filter 230 such that the filter process is performed. More specifically, the filter controller 231 selects the boundary strength Bs=1.

When neither the block P nor the block Q belongs to the merged area in the triangle merge prediction (step S3: NO), in step S5, the filter controller 231 determines whether or not a non-zero transform coefficient is included in at least one of the blocks P and Q. When a non-zero transform coefficient is included in at least one of the blocks P and Q (step S5: YES), in step S4, the filter controller 231 controls the deblocking filter 230 such that the filter process is performed. More specifically, the filter controller 231 selects the boundary strength Bs=1.

When a non-zero transform coefficient is included in neither the block P nor the block Q (step S3: NO), that is, when the prediction block is set as the reconstructed block as is, in step S6, the filter controller 231 determines whether or not the numbers of motion vectors and reference images (reference frames) of the blocks P and Q are different. When the numbers of motion vectors and the reference images of the blocks P and Q are different (step S6: YES), in step S4, the filter controller 231 controls the deblocking filter 230 such that the filter process is performed. More specifically, the filter controller 231 selects the boundary strength Bs=1.

When the numbers of the motion vectors and the reference images of the blocks P and Q are the same (step S6: NO), in step S7, the filter controller 231 determines whether or not a difference between the motion vectors of the blocks P and Q is equal to or greater than a threshold value. When the difference between the motion vectors of the blocks P and Q is equal to or greater than the threshold value (step S7: YES), in step S4, the filter controller 231 controls the deblocking filter 230 such that the filter process is performed. More specifically, the filter controller 231 selects the boundary strength Bs=1.

When the difference between the motion vectors of the blocks P and Q is less than the threshold value (step S7: NO), for example, when the values of the motion vectors of the blocks P and Q are the same, in step S8, the filter controller 231 controls the deblocking filter 230 such that the filter process is not performed. More specifically, the filter controller 231 selects the boundary strength Bs=0.

Note that order of the determination steps illustrated in FIG. 10 is merely an example, and order of the determination steps may be changed. For example, determination in step S3 may be performed after determination in step S7.

A program may be provided to cause a computer to execute the operations of the image encoding device 1. A program may be provided to cause a computer to execute the operations of the image decoding device 2. The program may be stored in a computer-readable medium. The program can be installed on a computer from a computer-readable medium having the program stored thereon. The computer-readable medium having the program stored thereon may be a non-transitory recording medium. The non-transitory recording medium may include, but is not limited to, a CD-ROM and a DVD-ROM for example.

The encoding device 1 may be embodied as a semiconductor integrated circuit (chipset, SoC, etc.) by integrating the circuits that execute the respective operations of the encoding device 1. The decoding device 2 may be embodied as a semiconductor integrated circuit (chipset, SoC, etc.) by integrating the circuits that execute the respective operations of the decoding device 2.

The embodiments have been described in detail above with reference to the drawings. Specific configurations are not limited to the above-described configurations, and various design changes, and the like are possible within the scope not deviating from the gist.

The invention claimed is:

1. An encoding device that performs encoding on each of blocks obtained by dividing an image, the encoding device comprising:
    a merge predictor circuitry configured to generate area prediction images of a plurality of divided areas obtained by dividing an encoding-target block and merge areas at boundaries of a plurality of the generated area prediction images through weighted averaging to generate a prediction block of the encoding-target block;
    a transformer/quantizer circuitry configured to perform a transform process and a quantization process on a prediction residual that represents a difference between the encoding-target block and the prediction block;
    an inverse quantizer/inverse transformer circuitry configured to restore the prediction residual by performing an inverse quantization process and an inverse transform process on transform coefficients obtained by the transformer/quantizer;
    a combiner circuitry configured to combine the restored prediction residual and the prediction block to reconstruct the encoding-target block;
    a deblocking filter circuitry configured to perform a filter process on a block boundary between two blocks including the reconstructed encoding-target block and an adjacent block adjacent to the encoding-target block; and
    a filter controller circuitry configured to control the deblocking filter based on a position of a merged area merged by the merge predictor through the weighted averaging, wherein
    the deblocking filter is configured to perform the filter process in units of two sub-blocks across the block boundary, and
    the filter controller is configured to control the deblocking filter such that the filter process is performed on a sub-block boundary in response to the sub-block boundary between the two sub-blocks being adjacent to the merged area.

2. The encoding device according to claim 1, wherein
    when the sub-block boundary is not adjacent to the merged area, the filter controller is configured to control whether or not the filter process is performed on the sub-block boundary based on at least one of whether or not a non-zero transform coefficient exists in each of the two sub-blocks or information regarding motion vectors of the two sub-blocks.

3. A decoding device that performs decoding on each of blocks obtained by dividing an image, the decoding device comprising:
    an entropy decoder circuitry configured to output transform coefficients corresponding to a decoding-target block by decoding an encoded stream;
    an inverse quantizer/inverse transformer circuitry configured to restore a prediction residual by performing an inverse quantization process and an inverse transform process on the transform coefficients outputted by the entropy decoder;
    a merge predictor circuitry configured to generate area prediction images of a plurality of divided areas obtained by dividing the decoding-target block and merge areas at boundaries of a plurality of the generated area prediction images through weighted averaging to generate a prediction block of the decoding-target block;
    a combiner circuitry configured to combine the restored prediction residual and the prediction block to reconstruct the decoding-target block;
    a deblocking filter circuitry configured to perform a filter process on a block boundary between two blocks including the reconstructed decoding-target block and an adjacent block adjacent to the decoding-target block; and
    a filter controller circuitry configured to control the deblocking filter based on a position of a merged area merged by the merge predictor through the weighted averaging, wherein
    the deblocking filter is configured to perform the filter process in units of two sub-blocks across the block boundary, and
    the filter controller is configured to control the deblocking filter such that the filter process is performed on a sub-block boundary in response to the sub-block boundary between the two sub-blocks being adjacent to the merged area.

4. The decoding device according to claim 3, wherein
    when the sub-block boundary is not adjacent to the merged area, the filter controller is configured to control whether or not the filter process is performed on the sub-block boundary based on at least one of whether or not a non-zero transform coefficient exists in each of the two sub-blocks or information regarding motion vectors of the two sub-blocks.

5. A non-transitory computer readable storage medium storing a program causing a computer to function as the encoding device according to claim 1.

6. A non-transitory computer readable storage medium storing a program causing a computer to function as the decoding device according to claim 3.

* * * * *